United States Patent
Capt et al.

(10) Patent No.: US 10,650,788 B2
(45) Date of Patent: May 12, 2020

(54) MAPPING THE POSITION OF MULTIPLE PAIRED DISPLAY SCREENS

(71) Applicant: Adobe Inc., San Jose, CA (US)

(72) Inventors: Alexandre Capt, Landser (FR); Oscar Bolanos, St-Sulpice (CH)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 16/018,976

(22) Filed: Jun. 26, 2018

(65) Prior Publication Data

US 2019/0392782 A1 Dec. 26, 2019

(51) Int. Cl.
*G09G 5/14* (2006.01)
*G09G 5/37* (2006.01)
*G06K 7/14* (2006.01)
*G06F 3/14* (2006.01)

(52) U.S. Cl.
CPC ............ *G09G 5/14* (2013.01); *G06F 3/1446* (2013.01); *G06K 7/1417* (2013.01); *G09G 5/37* (2013.01)

(58) Field of Classification Search
CPC .......... G09G 5/14; G09G 5/37; G06K 7/1417; G06F 3/1446
See application file for complete search history.

(56) References Cited

U.S. PATENT DOCUMENTS

| | | | | |
|---|---|---|---|---|
| 2014/0293017 A1* | 10/2014 | Fei | ......................... | G09F 9/3026 348/51 |
| 2015/0237290 A1* | 8/2015 | Lee | .................... | H04N 5/44591 348/570 |
| 2017/0300769 A1* | 10/2017 | Vandeweerd | ........ | G06K 9/3233 |

OTHER PUBLICATIONS

Eclipse Digital, "Seada G4K User Guide", retrieved from https://www.eclipsedigitalmedia.co.uk/digital-signage-shop/seada-g4k-fanless-video-wall-controller/, on Jun. 26, 2018, 17 pages.

\* cited by examiner

*Primary Examiner* — Alexander Eisen
*Assistant Examiner* — Kebede T Teshome
(74) *Attorney, Agent, or Firm* — Brake Hughes Bellermann LLP (57) ABSTRACT

Systems and techniques for mapping the position of multiple display screens include receiving an image of multiple display screens having a unique encoding mechanism (e.g., QR code) displayed on each of the display screens, where the multiple display screens are configured in an arrangement. A virtual map of the unique encoding mechanisms is created by determining coordinates of the unique encoding mechanism displayed on each of the display screens using the image. A virtual map of the multiple display screens in the arrangement is created by determining coordinates of the multiple display screens using the virtual map of the unique encoding mechanisms. Electronic content is rendered on the arrangement of the multiple display screens using the virtual map of the multiple display screens.

14 Claims, 8 Drawing Sheets

MAPPING THE POSITION OF MULTIPLE PAIRED DISPLAY SCREENS

TECHNICAL FIELD

This description relates to mapping the position of multiple, paired display screens.

BACKGROUND

Electronic content may be displayed in various locations on different display devices that function as digital signage. For example, different display devices may be located throughout a store, a car dealership showroom, a shopping mall, in storefront windows, among other locations. The display devices may be intended to display electronic content so that the display devices function as digital signage. In some instances, it is desirable to arrange multiple display screens and pair the screens to display a coordinated display.

For instance, multiple display screens (or simply "displays") may be arranged to form a video wall. In this instance, a large display (i.e., the video wall) is made up of a collection of smaller displays. The displays may be individual display screens having different sizes and/or shapes. The displays may be arranged in an ordered manner, such as a grid, or may be arbitrarily arranged.

In order to make an experience (e.g., a video, an image, etc.) span across those displays, the exact position in space and visible viewport of the devices is needed. Traditionally, in a first way, the setup of such a video wall may be done by first laying out the exact position of each of the displays. For instance, a complex user interface may be used to precisely layout and determine the placement and positioning of the displays. Then, the displays may be arranged and positioned exactly according to the layout. Typically, the displays may need to be arranged to the millimeter for the experience to align properly. In this process, it is also important to properly locate each display in its correct location of the layout so that the experience will display properly over all of the displays.

Alternatively, in a second way, in order to make the experience span across those displays, the displays may first be arranged in a layout for the video wall. Then, the exact position of each display is measured to the millimeter and laid out on a complex user interface. Again, as mentioned above, the location of each specific display in the layout needs to be known so that the experience will display properly over all of the displays. When multiple display screens are arranged in an arrangement, the exact coordinates of the display screens are needed so that exact portions of digital content (e.g., a composite image or video) can be displayed on specifically identified display screens. If the exact locations of the viewable portions of each display screen is not known or is measured incorrectly, then the digital content will not be displayed properly on the desired display screen. Determining the exact coordinates of the display screens hanging in space can be a very cumbersome and complicated process, especially when many devices having different sizes are arranged in an irregular shape. The traditional approaches described above are fastidious and error prone. These and other prior approaches may not be accurate and may result in errors in the calculation and determination of the position of each display.

Thus, a technical problem is presented to precisely determine the exact position of each display in an arrangement of multiple displays that are paired together to present an experience of digital (or electronic) content in an easy and error free manner.

SUMMARY

This document describes systems and techniques to precisely determine the exact position of each display in an arrangement of multiple displays in an automated manner. According to one general aspect, systems and techniques for mapping the position of multiple display screens include receiving an image of multiple display screens having a unique encoding mechanism (e.g., a QR code) displayed on each of the display screens, where the multiple display screens are configured in an arrangement. A virtual map of the unique encoding mechanisms displayed on each of the display screens is created by determining coordinates of the unique encoding mechanisms displayed on each display screen using the image. A virtual map of the multiple display screens in the arrangement is created by determining coordinates of the multiple display screens using the virtual map of the unique encoding mechanism. Electronic content is rendered on the arrangement of the multiple display screens using the virtual map of the multiple display screens.

The details of one or more implementations are set forth in the accompanying drawings and the description below. Other features will be apparent from the description and drawings, and from the claims.

DETAILED DESCRIPTION

This document describes systems and techniques for determining the exact position in space of multiple, paired display screens (e.g., a television, a smart television, a monitor, a computer screen, a laptop screen, a tablet, a phone or any other type of electronic device having a display). Display screen also may be referred to interchangeably throughout as a display. The systems and techniques provide a technical solution to the technical problems described above, for instance, when multiple display screens are arranged in an arrangement to display a composite image or video overlaid in specific positioning on the viewable portions (i.e., viewports) of specific display screens.

For example, the systems and techniques use an encoding mechanism (e.g., quick response (QR) code) (hereinafter "QR code), on each of the displays. The QR code on a display uniquely identifies the display and may contain the known properties of the display. The QR codes are positioned on the screens of each of the displays. For example, the QR codes are positioned in the center of the screen of each of the displays. The size and shape of the QR codes are known relative to the known properties of the displays (e.g., display height, display width, display aspect ratio, display resolution, etc.).

An image (e.g., a photograph) is taken of the displays with the QR codes displayed on the display screens. The image is a picture of the QR codes as displayed on the display screens. The image may be generated by taking a picture with a digital camera. The image with the QR codes is processed and the position of each of the QR code is computed and a virtual map of the QR codes is created. For instance, the virtual map includes X, Y coordinates of each of the QR codes. From this virtual map, a virtual map of the display screens may be generated using the size and position information of the QR codes and the size information of the displays. The virtual map of the display screens includes the precise position of each of the displays. For instance, the map includes the X, Y coordinates of the displays as arranged for viewing. From this virtual map of the display screens, a rendering engine can compute what portions of the electronic content will be displayed on each of the displays that make up the multiple paired display screens. For example, the digital content may be overlaid on top of the virtual map of the display screens so the exact position of the digital content can be rendered as desired on the viewports of the display screens.

An application creates a virtual map of the physical display screens. The application creates the virtual map from an image taken of the display screens while they display a QR code. From the image, the application creates a virtual map of the QR codes and then creates a virtual map of the display screens from the virtual map of the QR codes. The application can then determine how to render digital content on the display screens using the virtual map of the display screens. Additional details and various implementations are discussed below with respect to the figures.

In this manner, the technical solution determines the coordinates of the displays in an automated manner, which is faster and more reliable than traditional methods. This eliminates any translation errors in determining the coordinates by traditional methods. Also, the technical solution creates a virtual map using the display screen coordinates in a manner more precisely and accurately than before so that the electronic content displayed on the display screens renders on the desired display screens. Further, the technical solution determines the coordinates more efficiently and in a faster manner than traditional methods and does not require the use of more complicated algorithms such as, for example, edge detection algorithms, which require more computational processing power and are not able to uniquely identify the displays. The technical solution using the QR code displayed on the display screens both uniquely identifies each display and enables the computation of the exact coordinates for each display. The QR code encodes all of the display screen information and then allows the computation of the exact position of the display screen in space.

As used herein, display screen refers to any display capable of displaying any electronic content including digital signage. A display screen includes a television, a smart television, a monitor, a computer screen, a laptop screen, a tablet, a phone or any other type of electronic device having a display. Of course, a display screen includes screen of any shape and/or size.

As used herein, digital signage refers to electronic content made up of multiple digital assets that are displayed on a display device according to a schedule for the display of the electronic content. For example, digital signage includes electronic content displayed on display devices located in various commercial or retail settings that is displayed according to a schedule. Digital signage is a sub-segment of signage. Digital signs use technologies such as LCD, LED and Projection to display electronic content such as digital images, video, streaming media, and information. Digital signs can be found in public spaces, transportation systems, museums, stadiums, retail stores, hotels, restaurants, and corporate buildings etc., to provide wayfinding, exhibitions, marketing and outdoor advertising as well as many other purposes.

As used herein, a digital asset refers to any type of individual element of digital content including, but not limited to, an image, a video, a picture, an audio snippet, a graphic, a logo, a presentation slide, etc.

As used herein, an encoding mechanism refers to any mechanism that is uniquely identifiable and capable of encoding information. The encoding mechanism may be capable of being displayed on a display and have dimensions, such as height and width. The encoding mechanism contains information about the item to which it is attached. When displayed on a display screen, the encoding mechanism includes information about the display screen including, for example, its height, width, resolution and aspect ratio. One example of an encoding mechanism is a QR code. A QR code is a type of machine readable optical label that contains information about the item to which it is attached. The QR code is a two-dimensional square barcode which can store encoded data. The QR code may have known properties including a known height and width and at the same time encode properties of the item to which it is attached. When displayed on a display screen, the QR code uniquely identifies the display screen and includes information about this display screen including, for example, its height, width, resolution and aspect ratio. Other types of encoding mechanisms are also contemplated and included such as, for example, a datamatrix code, a micro-datamatrix code, a PDF417 code, a truncated PDF417 code, an Aztec code, all of which are two-dimensional barcode types.

Figure 1:
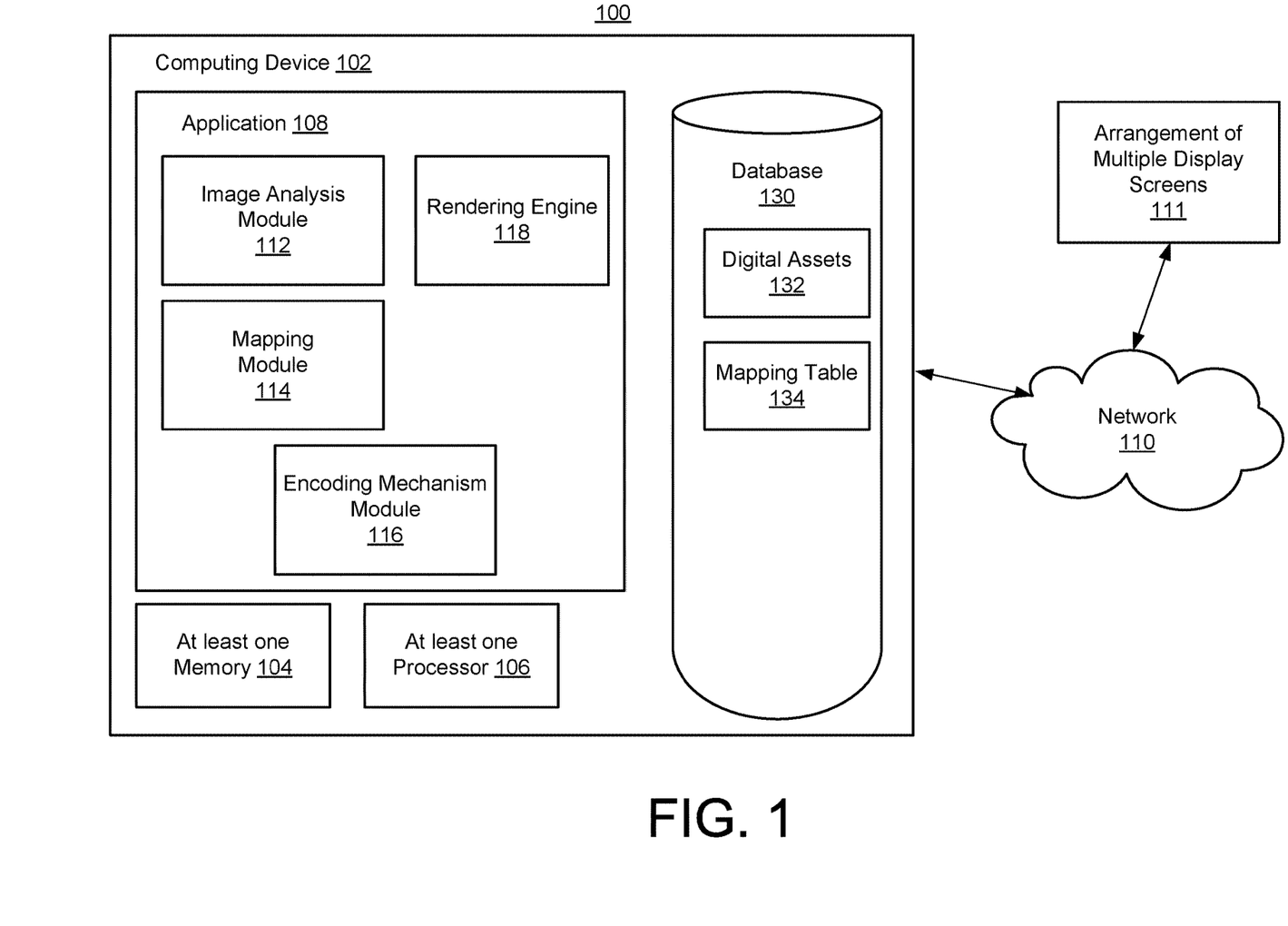
FIG. 1 is a block diagram of a system for mapping the position of multiple paired display screens.

FIG. 1 is a block diagram of a system 100 for mapping the position of multiple paired display screens. The system 100 includes a computing device 102 having at least one memory 104, at least one processor 106 and at least one application 108. In this document, the computing device 102 may be referred to interchangeably as a central computing device. The computing device 102 may communicate with one or more display screens 111 over a network 110. As discussed in more detail below, the display screens 111 may be paired and/or connected to the network 110 and may be organized in an arrangement to display integrated electronic content using the multiple paired display screens 111.

The computing device 102 may be implemented as a server, a desktop computer, a laptop computer, a mobile device such as a tablet device or mobile phone device, as well as other types of computing devices. Although a single computing device 102 is illustrated, the computing device 102 may be representative of multiple computing devices in communication with one another, such as multiple servers in communication with one another being utilized to perform its various functions over a network, such as the network 110.

The at least one processor 106 may represent two or more processors on the computing device 102 executing in parallel and utilizing corresponding instructions stored using the at least one memory 104. The at least one memory 104 represents a non-transitory computer-readable storage medium. Of course, similarly, the at least one memory 104 may represent one or more different types of memory utilized by the computing device 102. In addition to storing instructions, which allow the at least one processor 106 to implement the application 108 and its various components, the at least one memory 104 may be used to store data, such as one or more of the objects or files generated by the application 108 and its components, including the database 130.

The network 110 may be implemented as the Internet, but may assume other different configurations. For example, the network 110 may include a wide area network (WAN), a local area network (LAN), a wireless network, an intranet, combinations of these networks, and other networks such as a cable or optical network. Of course, although the network 110 is illustrated as a single network, the network 110 may be implemented as including multiple different networks.

The application 108 may be accessed directly by a user of the computing device 102. In other implementations, the application 108 may be running on the computing device 102 as a component of a cloud network where a user accesses the application 108 from another computing device over a network, such as the network 110. In one implementation, the application 108 may be a digital asset management application that enables users to precisely map the coordinates of the arrangement of multiple display screens 111 in space and to deliver electronic content for display on the multiple display screens 111. The application 108 creates a virtual map of the physical display screens 111. The application 108 creates the virtual map from an image taken of the display screens 111 while they display a QR code. From the image, the application 108 creates a virtual map of the QR codes and then creates a virtual map of the display screens from the virtual map of the QR codes. The application 108 can then determine how to render digital content on the display screens 111 using the virtual map of the display screens.

The application 108 may include components that enable users to create the electronic content and/or to organize the electronic content for rendering and display on the arrangement of the multiple display screens 111. The application 108 may be a standalone application that runs on the computing device 102. Alternatively, the application 108 may be an application that runs in another application such as a browser application or be a part of a suite of applications running in a cloud environment.

As referred to above, the arrangement of multiple display screens 111 may include any organization or arrangement of display screens that cooperate together to display electronic content. The display screens 111 may include any type of display, where the display is capable of receiving and displaying electronic content, including a portion of electronic content that is distributed across the multiple display screens 111. For example, in some implementations, the display screens 111 include televisions and/or smart televisions. In some implementations, the display screens 111 may include monitors, computer screens, laptop screens, tablets, phone screens, etc.

In some implementations, the arrangement of display screens 111 may include different types of display screens included as part of the same arrangement. For example, the arrangement of display screens 111 may include a combination of televisions and monitors.

In some implementations, the arrangement of display screens 111 may use different size and/or different shaped display screens as part of the arrangement. For example, different size and/or different shaped televisions may be used as part of the arrangement. In another example, a combination of different size and/or different shaped televisions and monitors may be used as part of the arrangement.

The display screens 111 may be arranged in any manner. In some implementations, the display screens 111 may be arranged in a grid or a pattern such as, for example, a geometric pattern. In some implementations, the display screens 111 may be arranged in a seemingly arbitrary arrangement or irregular shape or pattern.

In one use case, the arrangement of the display screens 111 may be used for digital signage in the context of a video wall. In many cases, a video wall is made up of a collection of smaller displays that may be arranged in a grid or in an arbitrary arrangement. In another use case, the arrangement of the display screens 111 may be used for an artistic display in the context of a video wall. Again, the video wall may be made up of a collection of smaller displays that may be arranged in a grid or in an arbitrary arrangement or other artistic pattern. In these use cases, and as discussed above, the precise position of each of the displays in the video wall is needed in order to properly display the electronic content such as the digital signage or the artistic display.

Figure 3A:
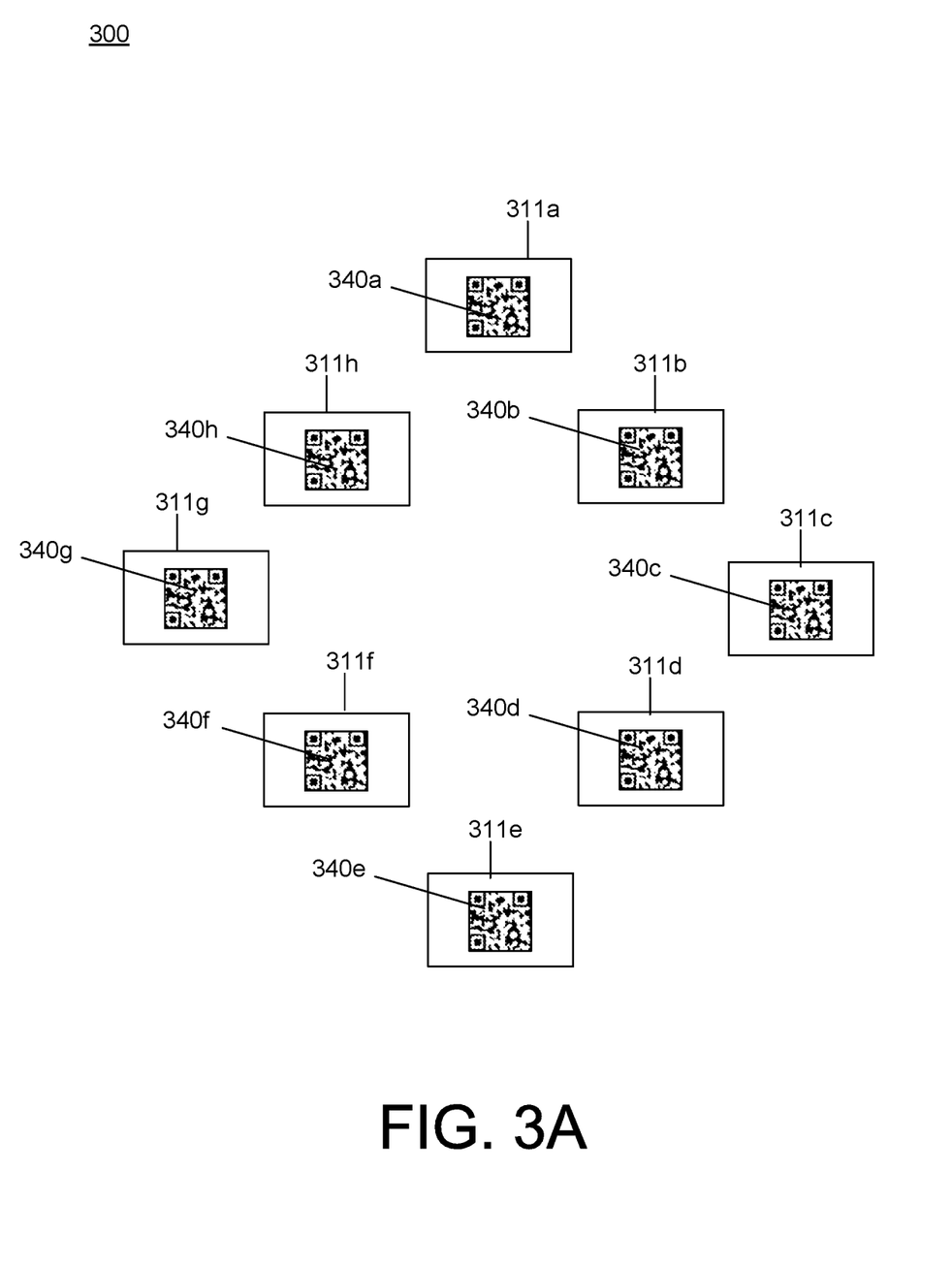
FIG. 3A is an example sketch of an arrangement of display screens with a unique encoding mechanism on each of the display screens.

Referring to FIG. 3A, an example sketch of an arrangement 300 of display screens 311*a*-311*h* is illustrated. The arrangement 300 of the display screens 311*a*-311*h* may be for digital signage in the context of a video wall on display in any location such as a store or in a storefront or in a restaurant, etc. The arrangement 300 of the display screens 311*a*-311*h* may be for an artistic display in the context of a video wall on display in any location.

The display screens 311*a*-311*h* may be paired meaning that they may be configured to receive the same electronic content or a portion of the same electronic content over a network for display in a coordinated manner to display the electronic content as desired. To properly display the electronic content on the display screens 311*a*-311*h*, the exact position of each of the display screens 311*a*-311*h* is needed.

Referring back to FIG. 1, at a general level, the application 108 includes an image analysis module 112, a mapping module 114, an encoding mechanism module 116 and a rendering engine 118. The computing device 102 also includes a database 130, which includes digital assets 132 and a mapping table 134.

The image analysis module 112 is configured to receive an image of an arrangement of multiple display screens 111, where each of the display screens includes a unique encoding mechanism displayed on the screen. The image is a picture of the QR codes as displayed on the display screens. The image may be generated by taking a picture with a digital camera.

As used herein, an encoding mechanism refers to any mechanism that is uniquely identifiable and capable of encoding information. The encoding mechanism may be capable of being displayed on a display and have dimensions, such as height and width. The encoding mechanism contains information about the item to which it is attached. When displayed on a display screen, the encoding mechanism includes information about the display screen including, for example, its height, width, resolution and aspect ratio. One example of an encoding mechanism is a QR code. A QR code is a type of machine readable optical label that contains information about the item to which it is attached. The QR code is a two-dimensional square barcode which can store encoded data. The QR code may have known properties including a known height and width and at the same time encode properties of the item to which it is attached. When displayed on a display screen, the QR code uniquely identifies the display screen and includes information about this display screen including, for example, its height, width, resolution and aspect ratio. Other types of encoding mechanisms are also contemplated and included such as, for example, a datamatrix code, a micro-datamatrix code, a PDF417 code, a truncated PDF417 code, an Aztec code, all of which are two-dimensional barcode types.

The encoding mechanism may be any type of encoding mechanism that can uniquely identify a display screen. The encoding mechanism may include information about the display screen itself, including the display screen properties such as, for example, a height, a width, a resolution and an aspect ratio, as well as other information. The encoding mechanism may uniquely identify the display screen using an identifier such as an identification number or serial number that is encoded as part of the encoding mechanism.

In some implementations, the encoding mechanism is a quick response (QR) code. Each QR code can be unique and used to both uniquely identify the display screen and to included properties of the display screen such as those described above. Additionally, each QR code may be generated to have a uniform size. That is, each QR code may have a known width and a known length. In some implementations, the QR code is square-shaped. In this manner, the exact size of each QR code is known and the exact size of each display screen is known from the display screen properties that may be encoded as part of the QR code. The QR size information and the display screen size information are used by the application 108 to compute the coordinates of the display screens in the arrangement of the display screens 111.

Referring back to FIG. 3A, the display screens 311a-311h each display an QR code 340a-340h on their screen so that the QR code 340a-340h is visible. A single unique QR code is located in the exact center of each of the display screens 311a-311h.

Figure 3B:
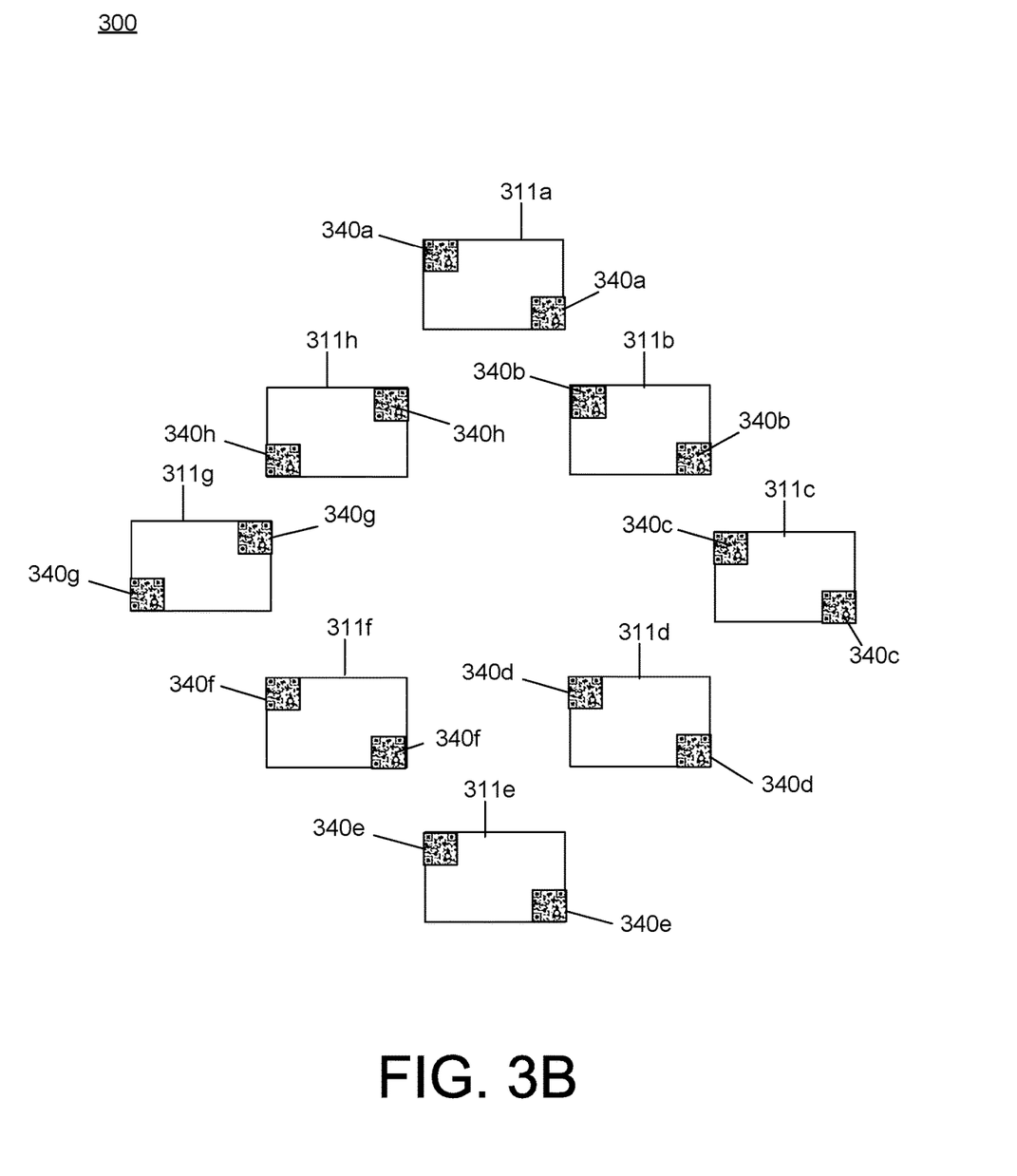
FIG. 3B is an example sketch of an arrangement of display screens with multiple unique encoding mechanisms on each of the display screens.
Figure 3C:
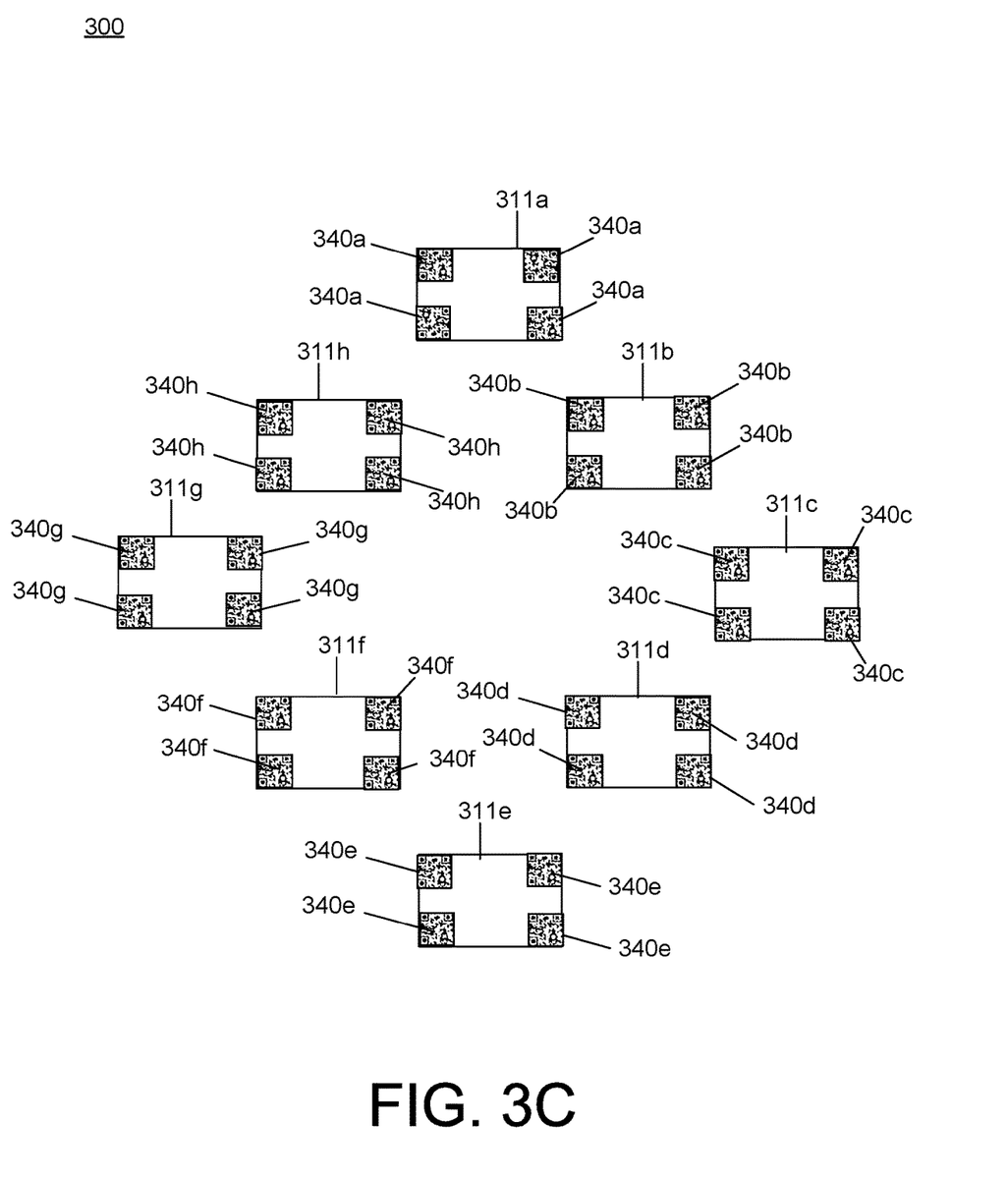
FIG. 3C is an example sketch of an arrangement of display screens with multiple unique encoding mechanisms on each of the display screens.

In some implementations, more than one QR code may be displayed on each of the display screens 311a-311h. Referring to FIGS. 3B and 3C, for instance, the same arrangement 300 of display screens 311a-311h is illustrated. In FIG. 3B, each of the display screens 311a-311h may have two QR codes 340a-340h located in two opposite corners of the screen. The same QR code may be used for each corner. As illustrated by display screens 311g and 311h, the QR codes 340g and 340h do not have to be in the same corners for all of the displays in the arrangement 300.

Alternatively, as illustrated in FIG. 3C, each of the display screens 311a-311h may have four QR codes 340a-340h with one QR code in each of the corners of the screen. Other numbers and placements of QR codes may be used as well. Multiple QR codes may be used, as illustrated in FIGS. 3B and 3C to know the boundaries of the display screens 311a-311h. The multiple QR codes may be useful when the QR codes do not contain size information for the display screens 311a-311h. The dimensions of the display screens may not be known and thus, the QR codes would not contain the information. Using multiple QR codes also may be useful to calculate and determine any perspective distortion to account for situations when an image taken of the arrangement is at an angle.

In some implementations, the display screens 311a-311h may be configured to enter a registration mode and generate its own QR code that uniquely identifies itself and includes the display screen properties. For instance, the display screens 311a-311h may be programmed to display its own QR code in the center of the screen when in a designated mode such as a registration mode. In some implementations, the display screens 311a-311h may be programmed to display its own QR code in the center of the screen when tuned to a designated channel or set to a particular input mode. The computing device 102 may generate a signal that is sent to the display screens 311a-311h through the network 110, where the signal causes or instructs the display screens 311a-311h to display the QR code. The signal may include instructions to display a single QR code in the center of the screen as in FIG. 3A or may include instructions to display multiple QR codes in each corner of the screen as in FIG. 3B.

Referring back to FIG. 1, in some implementations, the encoding mechanism module 116 is configured to generate and unique QR codes for each of the display screens 111. For instance, if the display screens are not capable of generating and/or displaying their own QR code, then the encoding mechanism module 116 may generate the QR codes and communicate the QR codes to the display screens 111 for display.

As mentioned above, the image analysis module 112 receives an image of the arrangement of the display screens 111 with the QR code shown on each screen. In some implementations, the image is a photograph that is taken of the arrangement of the display screens 111 and uploaded or otherwise communicated to the application 108 on the computing device 102 for processing by the image analysis module 112.

The image analysis module 112 is configured to process the image to read and decode the QR code and to initiate a new table in the mapping table 134 with the information encoded in each QR code. From the image, the image analysis module 112 extracts any encoded identifier for each display screen and populates that information, along with the display screen properties read and decoded from the QR code, into the new table in the mapping table 134. From the image, the image analysis module 112 converts the image into a digital representation of the image.

Figure 4A:
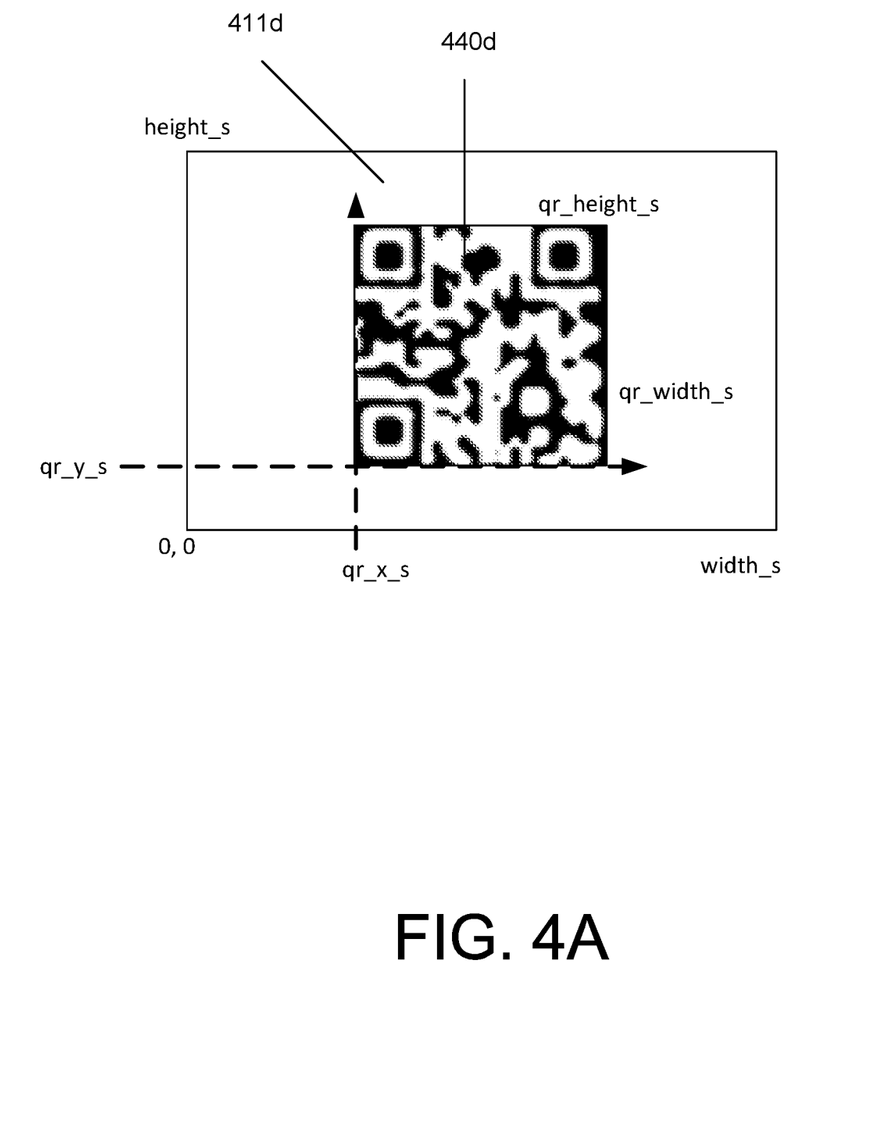
FIG. 4A is an example of the screen and encoding mechanism referential information.

Referring to FIG. 4A, an example of one display screen 411d and its QR code 440d is illustrated along with the information conveyed by the QR code. The image analysis module 112 passes the image and the information to the mapping module 114. The mapping module 114 is configured to map coordinates of the unique QR code on each of the display screens and to create a virtual map of the QR codes. Then, using the known height and width information of the QR code and the known height and width and other properties of the display screens and the virtual map of the QR codes, the mapping module creates a virtual map of the display screens by determining the coordinates of each of the display screens. The coordinate information for the QR codes and the display screens may be populated in the table in the mapping table 134. The virtual map of the QR codes and the virtual map of the display screens may be stored in the at least one memory 104. The coordinates of the display screens may be stored in the mapping table 134 from which the virtual map of the display screens may be created and/or re-created.

For example, the QR code 440d conveys the coordinates of the QR code 440d on the display screen 411a as "qr_x_s" for the x-coordinate and "qr_y_s" as the y-coordinate. The QR code 440d width, "qr_width_s," and the height, "qr_height_s," are also known because the size of the QR code 440d is known and encoded as part of the QR code. The QR code 440d also includes encoded information about the display screen 411d, including the display screen 411d width, "width_s," and height, "height_s."

Figure 4B:
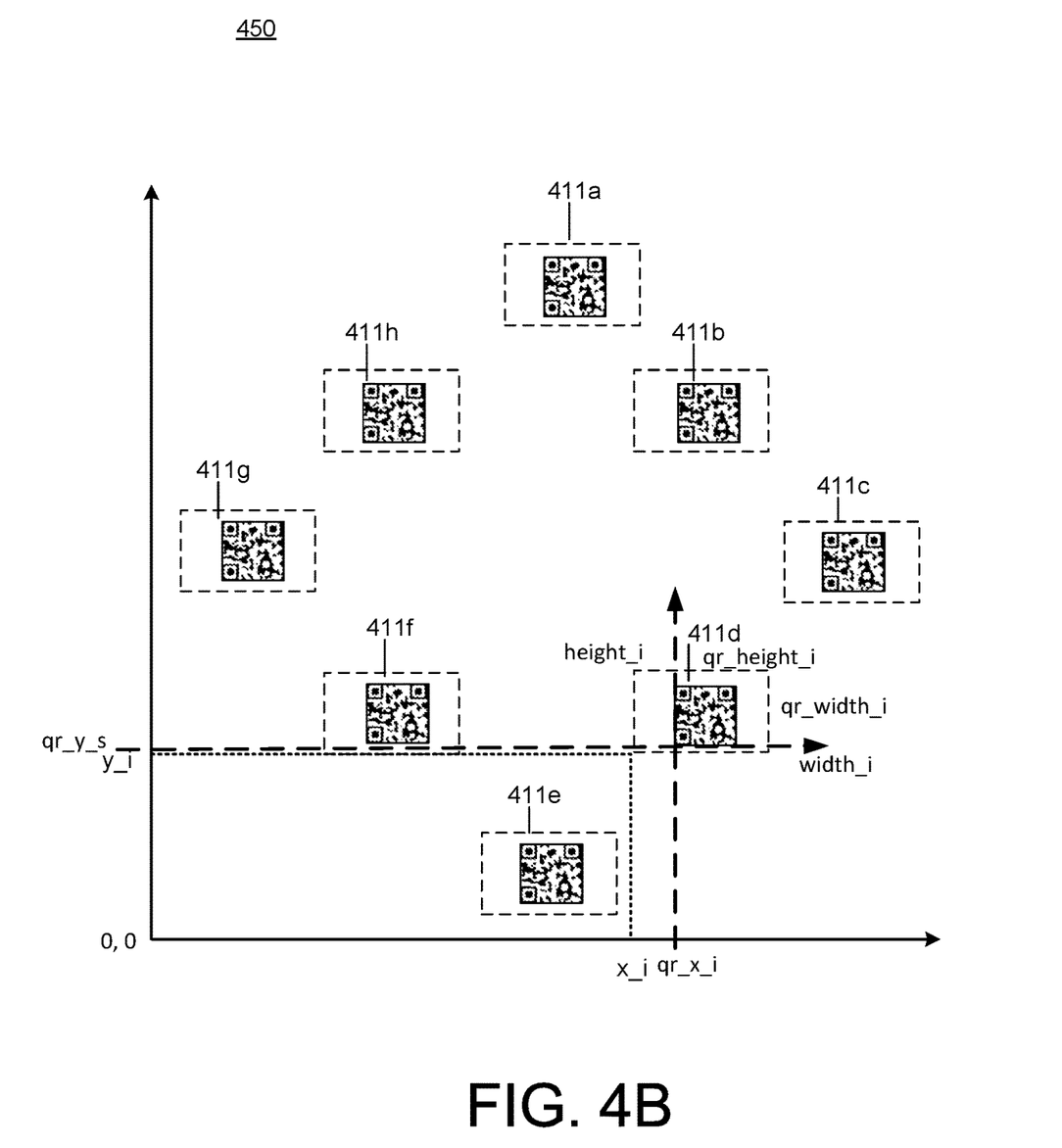
FIG. 4B is an example virtual map of the display screens of FIG. 3A.

In some implementations, the mapping module 114 creates a virtual map 400, as illustrated in FIG. 4B. The mapping module 114 takes the virtual map 400 of the display screens and overlays it onto a coordinate map, such as an X, Y coordinate map, as illustrated in FIG. 4B. The mapping module 114 generates a plot of the coordinates of the unique QR code using a size of the unique QR code and a location of each of the unique QR codes from the image. The mapping module 114 may first plot the coordinates of the QR code and then generate a plot of the multiple displays 411a-411h by adding in the height and width properties of the multiple displays to the plot of the coordinates of the unique QR codes. For example, the mapping module 114 uses information provided by the image analysis module 112 to develop the map, including the coordinates of the QR codes in the image "qr_x_i" and "qr_y_i" and the width of the QR code in the screen "qr_width_i" and the height of the QR code in the screen "qr_height_i."

In this example, the mapping module 114 creates an X, Y coordinate plot of the displays. For instance, let "R" be the ratio between the image of the QR code 440d and the image of the display screen 411d. The ratio, R, is the translation that is applied to the QR coordinates to compute the coordinates of the display screen 411d in the overall image of the display screens.

$$R = qr\_width\_i / qr\_width\_s$$

Without any distortion, R should be also equal to:

$$R = qr\_height\_i / qr\_height\_s$$

The x_i, y_i coordinates of the screen in the image is then:

$$x\_i = qr\_x\_i - qr\_x\_s * R$$

$$y\_i = qr\_y\_i - qr\_y\_s * R$$

The same logic applies to the width and height of the display screen 411d in the image:

$$width\_i = width\_s * R$$

$$height\_i = height\_s * R$$

This information is computed for all of the display screens 411a-411h in the image to enable the mapping module 114 to construct the virtual map to apply on top of an asset and to enable the rendering engine 118 to define which screen must show which part of the digital asset.

This information is stored in the mapping table 134 where the coordinate information may be linked or otherwise associated with each individual display screen.

In some implementations, the mapping module 114 may compute the coordinate information for each corner of each display screen and store the coordinate information in the mapping table 134. In this manner, the exact location of each specific display screen is known and is known relative to the each of the other display screens in the arrangement.

In some implementations, other types of coordinate plots may be used by the mapping module 114 along with other coordinate systems.

The rendering engine 118 is configured to render electronic content on the multiple display screens 111 in the arrangement using the virtual map of the multiple display screens. The rendering engine 118 uses the information generated by the mapping module 114, which may be stored in the mapping table 134, or in some implementations, provided directly from the mapping module 114 to the rendering engine 118 without storing the information in the mapping table 134. In this manner, the rendering engine 118 knows the exact location of each specific display screen in the arrangement of the display screens 111.

Figure 5:
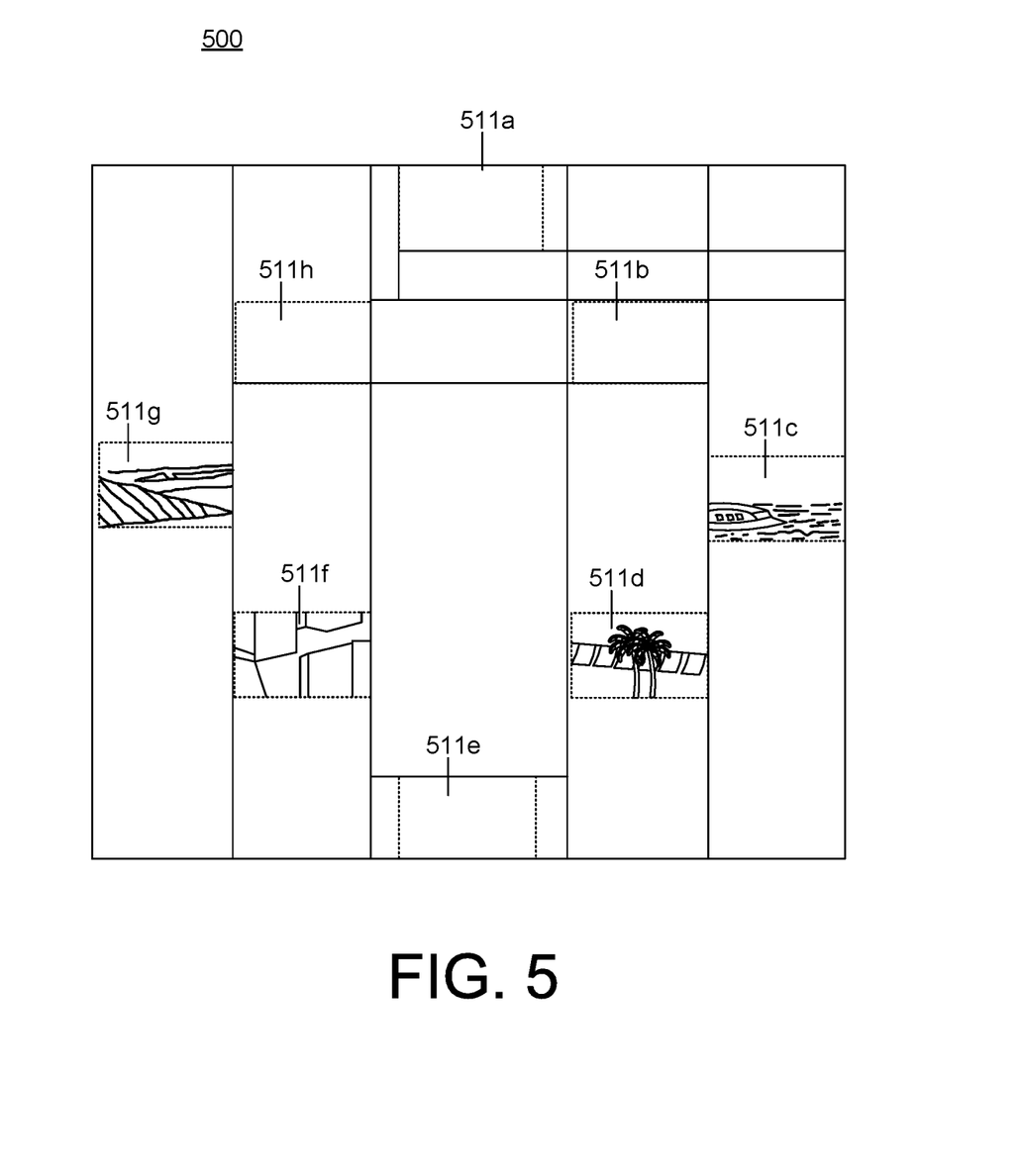
FIG. 5 is an example sketch of the arrangement of display screens of FIG. 3A with displayed electronic content.

FIG. 5 illustrates an example of electronic content being displayed on the display screens 511a-511h as rendered by the rendering engine 118. The rendering engine 118 may communicate the electronic content and the details for display by each of the display devices over the network 110. For example, the rendering engine 118 takes the information from the mapping module 114 and may overlap the digital assets to be displayed over the virtual map. In other examples, the rendering engine 118 uses the coordinate information that has been calculated and stored in the mapping table 134 to determine the exact placement of the digital assets on the display screens 511a-511h.

Figure 2:
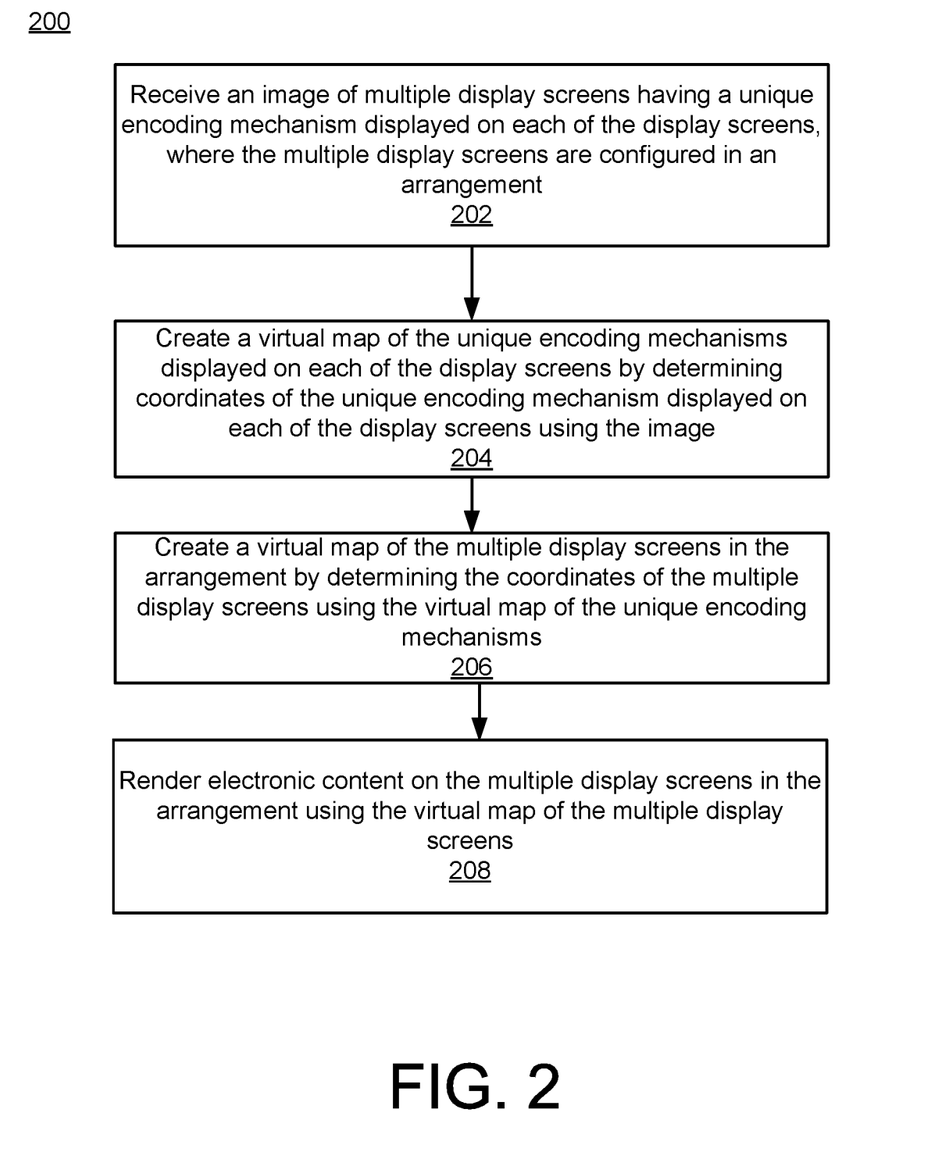
FIG. 2 is a flowchart illustrating example operations of the system of FIG. 1.

Referring to FIG. 2, an example process 200 illustrates the operations of the system 100 of FIG. 1. Process 200 includes a computer-implemented method for mapping the coordinates of the display devices in an arrangement. The process 200 determines a precise calculation of the display device positioning in the arrangement in an automated manner.

Process 200 includes receiving an image of multiple display screens having a unique QR code displayed on each of the display screens, where the multiple display screens are configured in an arrangement (202). For example, with respect to FIG. 1, the image analysis module 112 is configured to receive an image of multiple display screens having a unique QR code displayed on each of the display screens, where the multiple display screens are configured in an arrangement. As discussed above, the image received may be a photograph taken by a digital camera or other captured digital image of the arrangement of the multiple display screens.

Process 200 includes creating a virtual map of the unique encoding mechanisms displayed on each of the display screens by determining the coordinates of the unique encoding mechanism displayed on each of the display screens using the image (204). For example, the mapping module 114 is configured to create a virtual map of the unique encoding mechanisms displayed on each of the display screens by determining the coordinates of the unique encoding mechanism displayed on each of the display screens using the image. As discussed above, the encoding mechanisms may be unique QR codes that are generated and displayed on each of the display screens. In some implementations, a single QR code in the center of each screen is generated and displayed, as illustrated and discussed above with respect to FIG. 3A. In some implementations, multiple QR codes are generated and displayed on each screen, as illustrated and discussed above with respect to FIGS. 3B and 3C.

Process 200 includes creating a virtual map of the multiple display screens in the arrangement by determining the coordinates of the multiple display screens using the virtual map of the unique encoding mechanisms (206). For example, the mapping module 114 is configured to create a virtual map of the multiple display screens in the arrangement by determining the coordinates of the multiple display screens using the virtual map of the unique encoding mechanisms. As discussed above, the unique QR codes uniquely identifies the display screen and encodes properties of the display screen. The properties of the display screen can include a height, a width, a resolution and an aspect ratio. The properties of the display screen along with the properties of the QR code (e.g., height and width of the QR code) are used to calculate the coordinates and map the coordinates of each display screen in the arrangement.

Process 200 includes rendering electronic content on the multiple display screens in the arrangement using the coordinates of the multiple display screens (208). For example, the rendering engine 118 is configured to render electronic content on the multiple display screens in the arrangement using the coordinates of the multiple display screens.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer-implemented method for mapping positions of multiple display screens, the method comprising:
   receiving an image of the multiple display screens having a unique encoding mechanism displayed on each of the multiple display screens, wherein the multiple display screens are configured in an arrangement and the unique encoding mechanism uniquely identifies the each of the multiple display screens and encodes properties of the multiple display screens including a height, a width, a resolution and an aspect ratio;
   creating a virtual map of the unique encoding mechanisms displayed on the each of the multiple display screens by generating a plot of coordinates of the unique encoding mechanism using a size of the unique encoding mechanism and a location of each of the unique encoding mechanisms from the image;
   creating a virtual map of the multiple display screens in the arrangement by determining coordinates of the multiple display screens using the virtual map of the unique encoding mechanisms and generating a plot of the multiple display screens by adding the height and the width properties of the multiple display screens to the plot of the coordinates of the unique encoding mechanisms; and
   rendering electronic content on the multiple display screens in the arrangement using the virtual map of the multiple display screens.

2. The method of claim 1, wherein the unique encoding mechanism is a unique quick response (QR) code.

3. The method of claim 2, further comprising:
   generating unique QR codes; and
   displaying one of the unique QR codes in a center of each of the multiple display screens.

4. The method of claim 2, further comprising:
   generating four unique QR codes for each of the multiple display screens; and
   displaying one of the four unique QR codes in each corner of each of the multiple display screens.

5. The method of claim 1, wherein the multiple display screens include display screens having different sizes.

6. The method of claim 1, wherein the electronic content includes an integrated image on the multiple display screens in the arrangement.

7. A system for mapping position of multiple display screens, the system comprising:
at least one memory including instructions; and
at least one processor that is operably coupled to the at least one memory and that is arranged and configured to execute instructions that, when executed, cause the at least one processor to implement an application, the application comprising:
an image analysis module that is configured to receive an image of the multiple display screens having a unique encoding mechanism displayed on the each of the multiple display screens and encodes properties of the multiple display screens including a height, a width, a resolution and an aspect ratio;
a mapping module that is configured to:
create a virtual map of the unique encoding mechanisms displayed on the each of the multiple display screens by generating a plot of coordinates of the unique encoding mechanism using a size of the unique encoding mechanism and a location of each of the unique encoding mechanisms from the image;
create a virtual map of the multiple display screens in the arrangement by determining coordinates of the multiple display screens using the virtual map of the unique encoding mechanisms and generating a plot of the multiple display screens by adding the height and the width properties of the multiple display screens to the plot of the coordinates of the unique encoding mechanisms; and
a rendering engine that is configured to render electronic content on the multiple display screens in the arrangement using the virtual map of the multiple display screens.

8. The system of claim 7, wherein the unique encoding mechanism is a unique quick response (QR) code.

9. The system of claim 8, further comprising an encoding mechanism module that is configured to:
generate unique QR codes; and
display one of the unique QR codes in a center of each of the multiple display screens.

10. The system of claim 8, further comprising an encoding mechanism module that is configured to:
generate four unique QR codes for each of the multiple display screens; and
display one of the four unique QR codes in each corner of each of the multiple display screens.

11. The system of claim 7, wherein the multiple display screens include display screens having different sizes.

12. The system of claim 7, wherein the electronic content includes an integrated image on the multiple display screens in the arrangement.

13. A computer program product for mapping position of multiple display screens, the computer program product being tangibly embodied on a non-transitory computer-readable storage medium and comprising instructions that, when executed by at least one computing device, are configured to cause the at least one computing device to:
receive an image of the multiple display screens having a unique encoding mechanism displayed on each of the multiple display screens, wherein the multiple display screens are configured in an arrangement and the unique encoding mechanism uniquely identifies the each of the multiple display screens and encodes properties of the multiple display screens including a height, a width, a resolution and an aspect ratio;
create a virtual map of the unique encoding mechanisms displayed on the each of the multiple display screens by generating a plot of coordinates of the unique encoding mechanism using a size of the unique encoding mechanism and a location of each of the unique encoding mechanisms from the image;
create a virtual map of the multiple display screens in the arrangement by determining coordinates of the multiple display screens using the virtual map of the unique encoding mechanisms and generating a plot of the multiple display screens by adding the height and the width properties of the multiple display screens to the plot of the coordinates of the unique encoding mechanisms; and
render electronic content on the multiple display screens in the arrangement using the virtual map of the multiple display screens.

14. The computer program product of claim 13, wherein the unique encoding mechanism is a unique quick response (QR) code.

* * * * *